O. JOHNSON & C. O. WALL.
Grain Conveyer.
No. 100,154.
Patented Feb. 22, 1870.
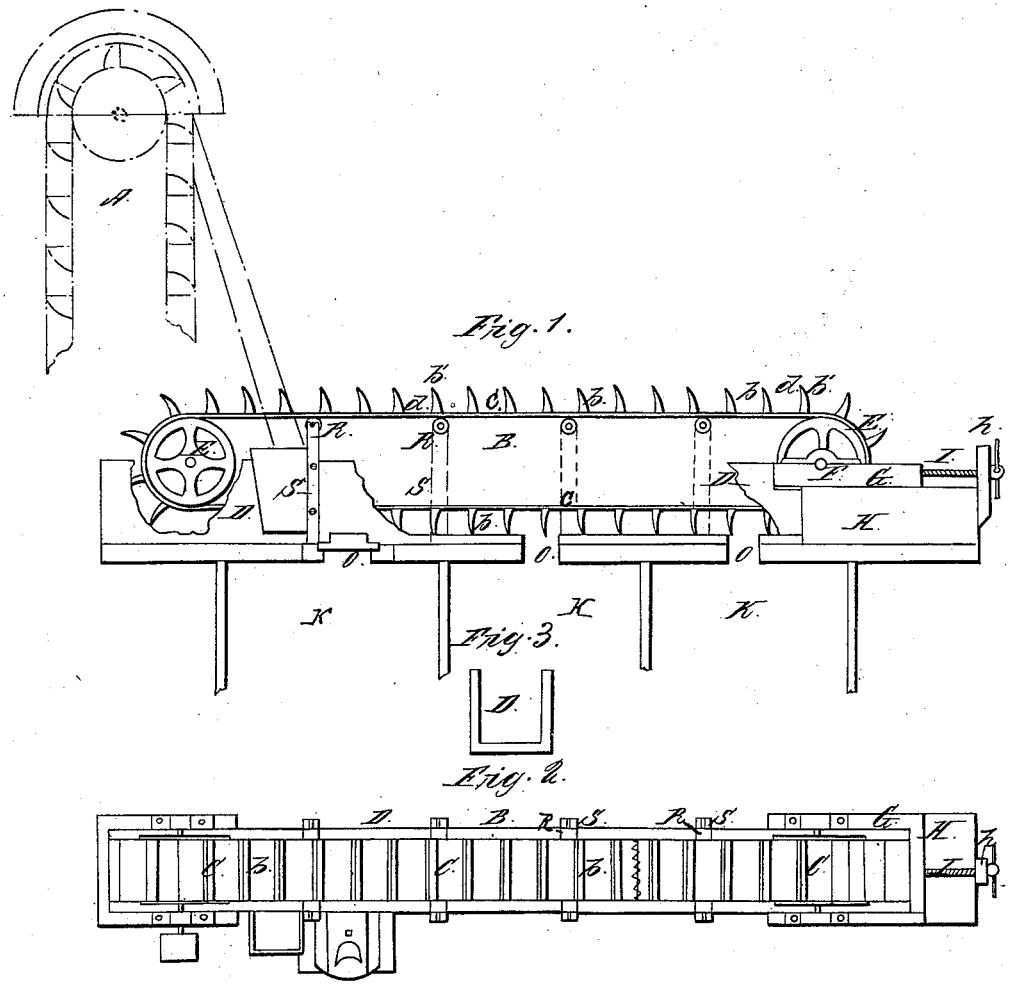

UNITED STATES PATENT OFFICE.

OLOF JOHNSON AND CARL O. WALL, OF GALVA, ILLINOIS.

IMPROVEMENT IN GRAIN-CONVEYERS.

Specification forming part of Letters Patent No. 100,154, dated February 22, 1870; antedated February 16, 1870.

*To all whom it may concern:*

Be it known that we, OLOF JOHNSON and CARL O. WALL, of Galva, in the county of Henry and State of Illinois, have invented certain new and useful Improvements in Grain-Conveyers; and we do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use our invention, we will proceed to describe it.

Figure 1 is the side elevation, and Fig. 2 the plan, of the conveyer. Fig. 3 is the cross-section of the trough.

The nature of our invention consists in a conveyer to be connected with any kind of elevators used in grain-warehouses and other places, said conveyer so arranged as to convey the elevated grain to any part of the house or to any of its bins.

A is an elevator, and B is the conveyer used in connection with the same, and placed on the upper floor of the building. It consists of an endless india-rubber or other belt, C, to which wooden blocks $b\ b$, of triangular shape, are affixed, each fifth block, $b'$, of these being provided with india-rubber or other elastic cushion, $d$, at the apex or rib, for the purpose of cleanly sweeping the grain in the trough D, in which the conveyer is placed. The belt is passed over pulleys E E, one or both of which are made adjustable, so as to stretch out the slackened belt, which may be done by journaling shaft F of the pulley to the sliding carriage G, placed on the stationary block H, and by operating the said carriage by means of screw I, connected with the carriage and working in a female thread-screw affixed in the stay $h$ of the block H; or the same may be effected by some other mechanical device. To one of the said pulleys E the power is applied. The upper part of the belt is supported by rollers R R, affixed to stays S S, secured to the sides of the trough D. The trough is provided with openings O O, communicating with grain-bins K K, and provided with suitable shutters or slides operated by suitable devices.

The operation consists in this, that the grain being elevated by the elevator A to the upper story is discharged by the spout Q into the trough D of the conveyer, and conveyed by the blocks $b\ b$ along the said trough to any of the openings O corresponding with the bin that is desirable to fill, the shutter of which opening being left open while shutters of other openings are closed.

What we claim as new, and desire to secure by Letters Patent, is—

1. The arrangement of a trough, D, with the conveyer B over a series of bins, K, said trough being provided with openings and slides for closing the same at will over each bin, all substantially as described.

2. The elastic cushions $d\ d$, when affixed to the blocks $b\ b$ of the grain-conveyer B, substantially as and for the purpose specified.

3. The trough or box D, arranged as described, when used for grain-conveying, substantially as herein set forth and specified.

4. The combination of the adjustable pulleys E with the conveyer B, having its elastic belt C provided with the elastic cushion $d$, all constructed and arranged to operate substantially as and for the purpose set forth.

OLOF JOHNSON.
CARL O. WALL.

Witnesses:
WM. F. THOMAS,
P. PETERSON, Jr.